March 2, 1926.  
R. D. SNYDER  
AUTOMOBILE CURTAIN  
Filed Jan. 31, 1925    3 Sheets-Sheet 1
1,575,455
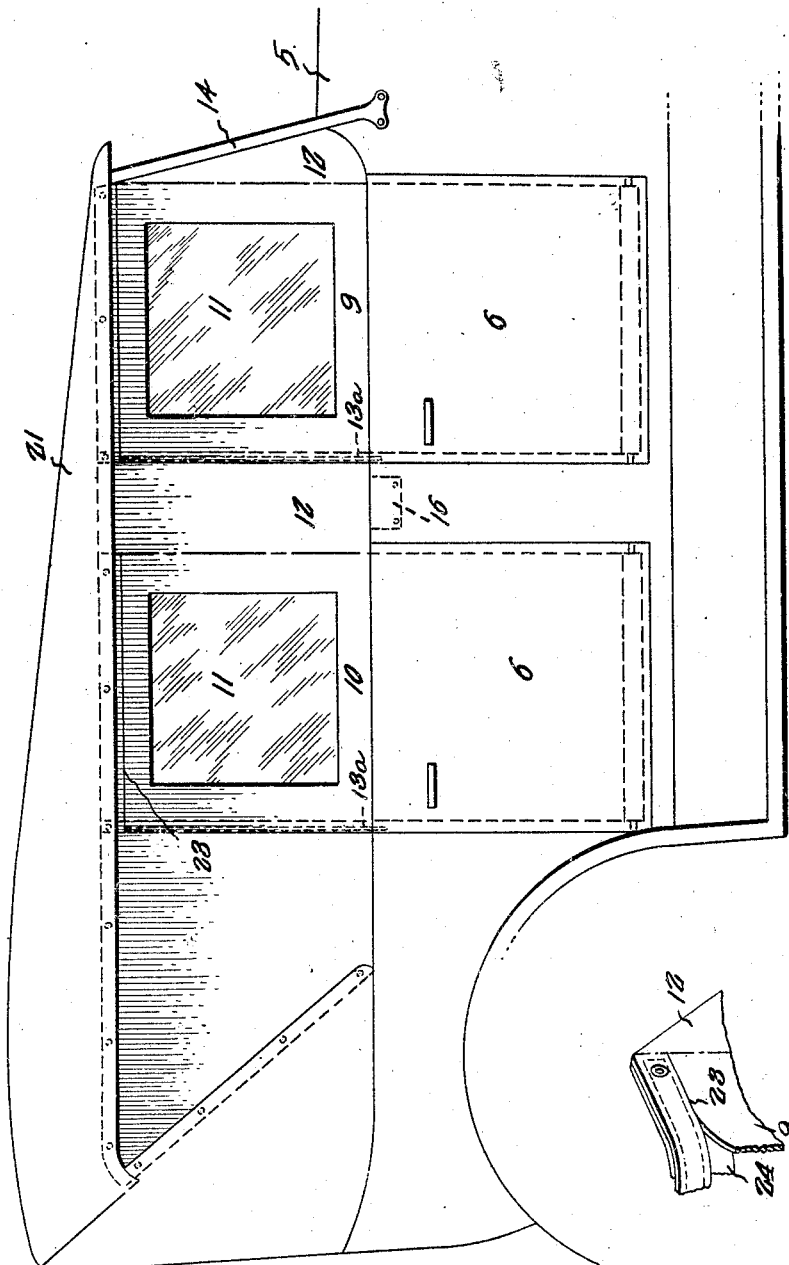
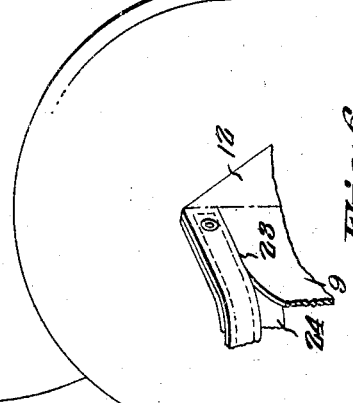
Raymond D. Snyder, Inventor
Witnesses
By Richard B. Owen,
Attorney March 2, 1926.
R. D. SNYDER
AUTOMOBILE CURTAIN
Filed Jan. 31, 1925
1,575,455
3 Sheets-Sheet 2
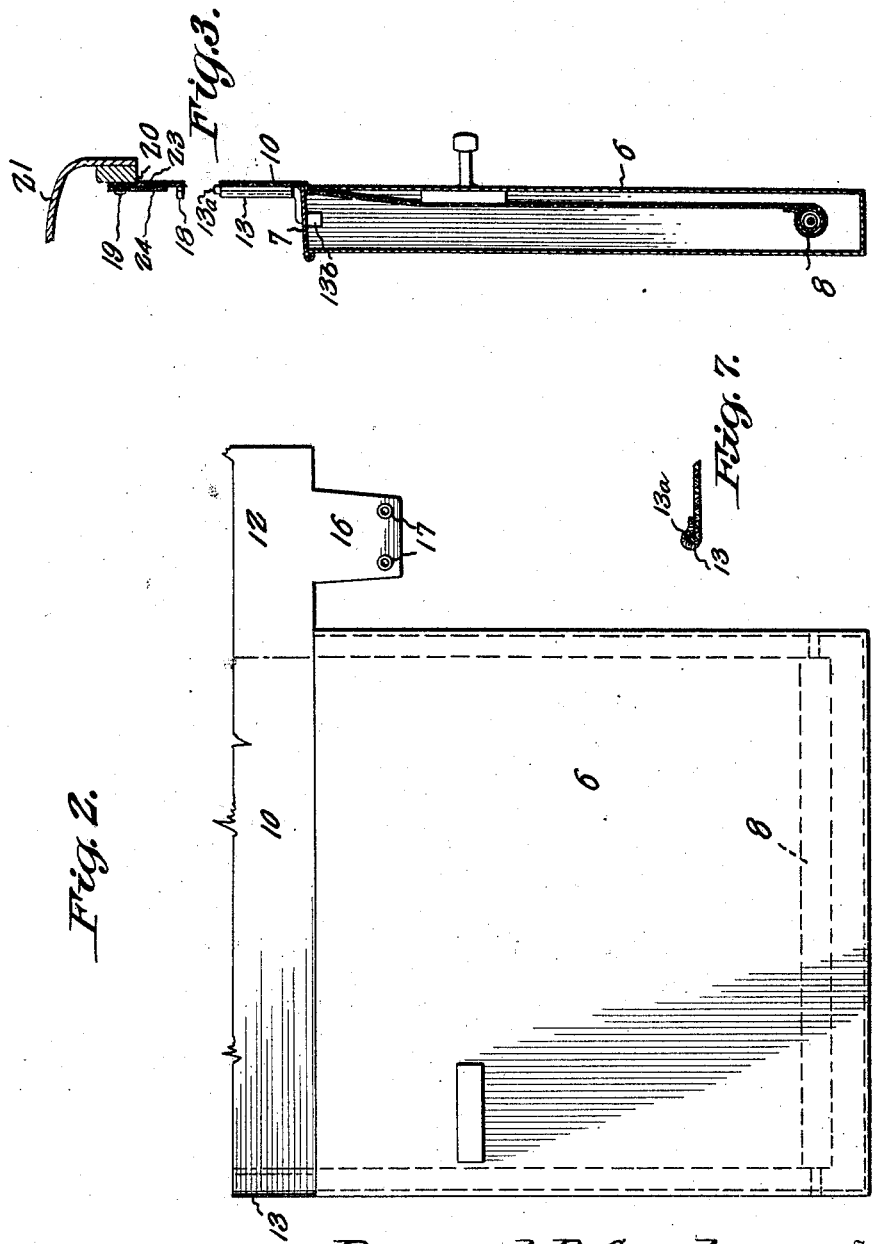
Raymond D. Snyder, Inventor
Witnesses
E. E. Churchman Jr.
J. S. Burck
By Richard B. Owen,
Attorney March 2, 1926.
R. D. SNYDER
AUTOMOBILE CURTAIN
Filed Jan. 31, 1925

Raymond D. Snyder, Inventor

By Richard B. Owen,
Attorney

Witnesses

Patented Mar. 2, 1926.

1,575,455

UNITED STATES PATENT OFFICE.

RAYMOND D. SNYDER, OF SOUDERTON, PENNSYLVANIA.

AUTOMOBILE CURTAIN.

Application filed January 31, 1925. Serial No. 6,132.

*To all whom it may concern:*

Be it known that I, RAYMOND D. SNYDER, a citizen of the United States, residing at Souderton, in the county of Montgomery and State of Pennsylvania, have invented certain new and useful Improvements in Automobile Curtains, of which the following is a specification.

This invention relates to certain new and useful improvements in automobile curtains, and has particular reference to side curtains for automobiles of the touring car type.

The primary object of the invention is to provide a curtain equipment for automobiles by means of which the curtains may be conveniently kept in position for ready access without danger of becoming damaged when not in use or from handling, and whereby the curtains may be readily and expeditiously placed in operative position to exclude rain or the like when necessary.

Another object of the invention is to provide a side curtain equipment for automobiles of the touring car type which embodies simplicity of construction and may be provided at a minimum expense.

Other objects are to provide for the proper holding of the side curtains in their operative position and in taut condition so that the entrance of wind is effectively prevented and whereby the curtains will present a neat appearance when in use.

Still another object of the invention is to generally simplify and improve automobile curtains of the above kind.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a fragmentary side elevational view showing a touring car body equipped with side curtains constructed in accordance with the present invention.

Figure 2 is an enlarged elevational view of one of the doors of the touring car or automobile body together with the adjacent portion of one of the side curtains in its raised or operative position.

Figure 3 is an enlarged vertical sectional view, partly broken away, taken through one of the doors and the curtain carried thereby together with the automobile top, the curtain being in operative position.

Figure 6 is a fragmentary perspective view showing the construction of the upper end portions of the curtains whereby opening of the automobile doors is freely permitted.

Figure 4:
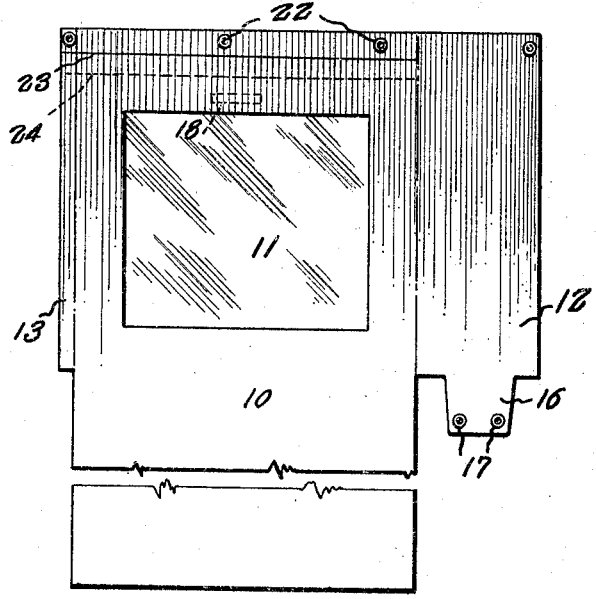
Figure 4 is a plan view of the side curtain employed in connection with the rear door of the automobile body, partly broken away.
Figure 5:
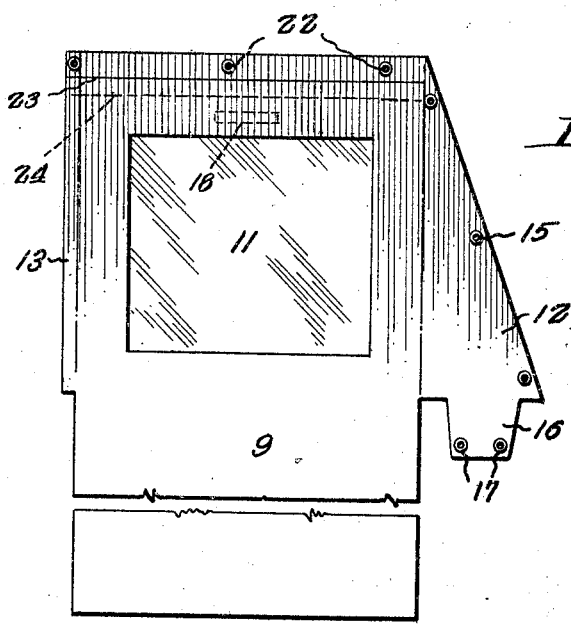
Figure 5 is a view similar to Figure 4 of the front side curtain.

The present curtain equipment will be provided at both sides of the vehicle body, but as the construction at each side is the same the description of one will suffice.

Referring more in detail to the drawing, 5 indicates the body of an automobile of the conventional touring car type, and 6 indicates the doors thereof, these doors being constructed of hollow form as clearly illustrated in Figure 3 and having a hinged lid at the top thereof as at 7 (see Figure 3) for a purpose which will presently become apparent.

Suitably mounted in a horizontal position within the lower portion of each of the doors 6 is a spring roller 8 similar to the rollers now commonly employed for window shades, and upon the roller in the front door is a front side curtain 9 while upon the roller in the rear door is a rear side curtain 10. Each of the curtains 9 and 10 consists of a rectangular body of flexible material such as leather or the like having transparent panels 11 in the upper portion thereof for permitting vision when the curtains are raised, the body of each curtain having a flap 12 upon the forward edge of the upper portion thereof.

Upon the rear edges of the upper portion of the curtains 9 and 10 are relatively narrow flaps in the form of open ended hems 13 adapted to receive the usual curtain rods 13$^a$ that are employed with automobile curtains and which are removably mounted in sockets 13$^b$ of the automobile doors. The flaps 12 are foldable onto the bodies of the curtains so that they may readily pass into the doors 6 when the curtains are lowered. The flap 12 is provided upon the body of the front side curtain 9 so as to close the space between the body of this curtain and the usual wind shield provided at 14 in the usual well known manner, while the flap 12 of the curtain 10 closes the space between the bodies of the two curtains 9 and 10 as shown clearly in Figure 1. Separable fastening means is provided to connect the free vertical edge of the front curtain flap 12 to the wind shield and these separable fasteners are preferably in the nature of buttons on the wind shield uprights cooperating with eyelets in the usual manner, the eyelets being indicated by the reference numeral 15.

In order to place the lower ends of the flaps 12 in more air tight relation to the body of the automobile, these flaps are provided at their lower ends with tongues 16 adapted to extend downwardly along the inner sides of the body as indicated by dotted lines in Figure 1 and to cooperate with buttons on the body so as to fasten to the latter, the tongues 16 being provided with eyelets 17 for this purpose.

Handles 18 may be provided upon the inner sides of the upper portions of the curtains 9 and 10 to facilitate raising of the same when desired, for holding the curtains in raised position against the action of the spring rollers 8, and for placing the curtains substantially in air tight relation with the auotmobile top 21, separable fasteners are provided including buttons 19 carried by the bow 20 and engageable in eyelets provided at the upper edges of the curtains as indicated at 22.

The bodies of the curtains are slit horizontally as at 23 near their upper edges and from their rear vertical edges to points adjacent to but spaced rearwardly from their front vertical edges, whereby the portions of the curtains below the slits readily open with the doors without requiring detachment of the curtains from the automobile top 21, flaps 24 being provided on the inside of the curtains to overlie and close the slits 23 when the doors are closed. The flaps are preferably attached above the slits 23 with free lower portions depending below said slits as shown in Fig. 6. It is noted that the adjacent vertical edges of the curtains are not connected so that no fasteners need be unfastened to allow the doors to open.

When the curtains are up, the lids 7 are closed to maintain the curtains taut and substantially flush with the outer surfaces of the doors as shown in Fig. 3.

When the curtains are not required for use, the flaps 12 and 13 are folded onto the body portions of the curtains after the curtain rods, 13ª have been disengaged from the doors, and then by opening the lids 7 of the doors 6, the curtains will be allowed to roll upon the rollers 8 and lower into the doors in an out-of-way position and free from wrinkles or liability to damage. It will thus be seen that I have provided a simple curtain equipment for automobiles which will effectively prevent the entrance of wind or rain and the like, that will present a neat appearance when properly placed in operative condition, and that involves construction whereby removal of the curtain rods from the curtains is rendered unnecessary. By leaving the curtain rods within the hems 13, the curtains are prevented from entirely rolling upon the rollers 8 so that the upper portions of the curtains will be unrolled at all times and in position for convenient access to the user.

Minor changes may be made without departing from the spirit or the scope of this invention as claimed.

What I claim as new is:—

1. In combination with an automobile body having a top and provided with doors of hollow form, and wherein the doors have horizontal spring rollers journaled in the lower portions thereof and are provided with open tops covered by hinged lids, flexible side curtains associated with said rollers and movable through the tops of the doors, said curtains having flaps upon the forward edges of the upper portions thereof foldable upon the body portion of the curtains when the latter are to be lowered into the doors, and further flaps in the forms of open ended curtain rod receiving hems upon the rear edges of the upper portions of the curtains, and means to detachably connect the upper ends of the curtains to the automobile top the adjacent vertical edges of the curtains being unconnected, said curtains being slit horizontally near their upper edges from their rear vertical edges to points spaced from but adjacent their front vertical edges.

2. In combination with an automobile body having a top and provided with doors of hollow form, and wherein the doors have horizontal spring rollers journaled in the lower portions thereof and are provided with open tops covered by hinged lids, flexible side curtains associated with said rollers and movable through the tops of the doors, said curtains having flaps upon the forward edges of the upper portions thereof foldable upon the body portion of the curtains when the latter are to be lowered into the doors, and further flaps in the forms of open ended curtain rod receiving hems upon the rear edges of the upper portions of the curtains, and means to detachably connect the upper ends of the curtains to the automobile top the adjacent vertical edges of the curtains being unconnected, said curtains being slit horizontally near their upper edges from their rear vertical edges to points spaced from but adjacent their front vertical edges, and flaps adapted to overlie and close said slits.

In testimony whereof I affix my signature.

RAYMOND D. SNYDER.